O'DELL KING, J. L. O. KING & T. H. FOX.
VEHICLE HUB.
APPLICATION FILED JAN. 6, 1915.
1,157,550.
Patented Oct. 19, 1915.
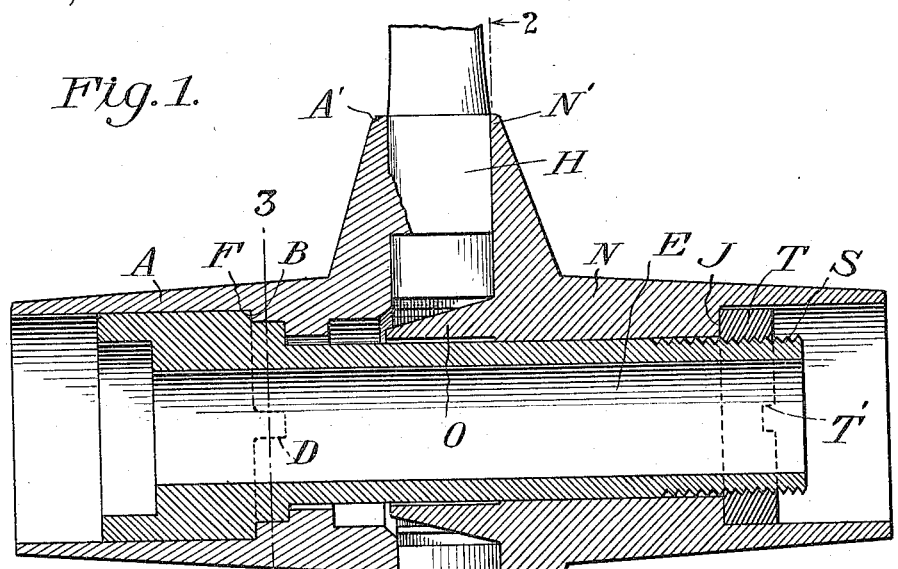
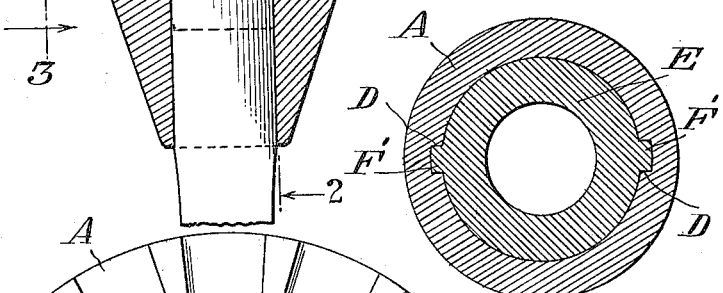
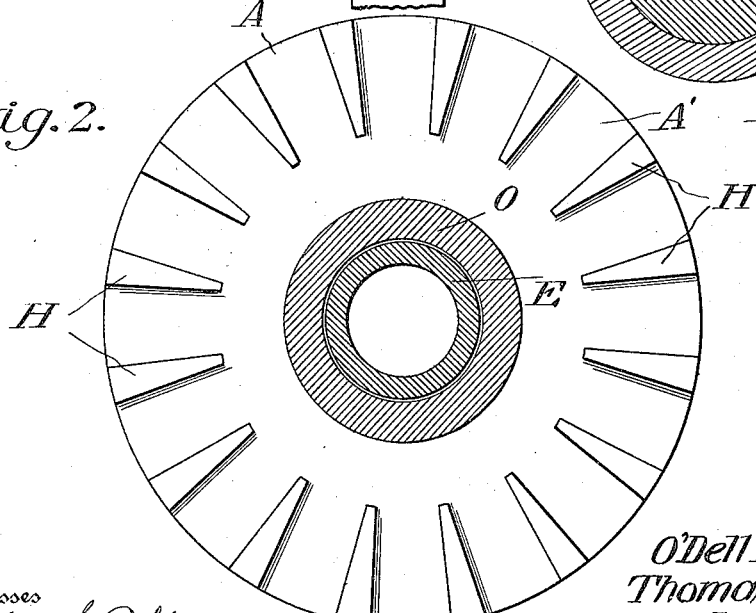
Witnesses
Fenton N Belt
J. N. Sherwood
Inventors.
O'Dell King
Thomas H. Fox
James L. O. King
By Franklin N. Hoyt
Attorney

UNITED STATES PATENT OFFICE.

O'DELL KING, JAMES LARENCE ORR KING, AND THOMAS HALSEY FOX, OF SANDY SPRINGS, SOUTH CAROLINA.

VEHICLE-HUB.

1,157,550.      Specification of Letters Patent.      Patented Oct. 19, 1915.

Application filed January 6, 1915. Serial No. 822.

*To all whom it may concern:*

Be it known that we, O'DELL KING, JAMES L. O. KING, and THOMAS H. FOX, citizens of the United States, residing at Sandy Springs, in the county of Anderson and State of South Carolina, have invented certain new and useful Improvements in Vehicle-Hubs; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in hubs for vehicle wheels and the object in view is to produce a simple and efficient device of this nature made up of sections which, when adjusted together, will securely hold the spokes in position and affording means for keeping them at all times tight.

Our invention consists of various details of construction, combinations and arrangements of parts, which will be hereinafter fully described, shown in the accompanying drawings and then specifically defined in the appended claim.

We illustrate our invention in the accompanying drawings, in which:

Figure 1 is a central longitudinal sectional view through the hub, Fig. 2 is a cross sectional view on line 2—2 of Fig. 1, and Fig. 3 is a sectional view on line 3—3 of Fig. 1.

Reference now being had to the details of the drawings by letter, A designates a hub section which is provided with an interior shoulder B with slots D formed in said shoulder. A boxing, designated by letter E, is adapted to pass through the opening in said hub section A and is provided with a shoulder F with oppositely disposed lugs F' thereon, designed to engage the recesses D, thereby preventing the boxing and the hub section from moving independent of each other. The hub section A has a flange A' upon the face of which are spoke engaging lugs H, spaced apart parallel to each other and between which the various spokes are held.

The second hub section is designated by letter N and provided with a flange N' and has an integral tapering, funnel-shaped boss O about its central aperture and which, when the two hub sections are adjusted together, is adapted to have a pressure against the inner ends of the spokes, tending to push the same against the rim and hold it tight. The inner surface of the hollow shell portion of the section N has a shoulder J and the circumference of the boxing near its end is threaded as at S. A nut T has interior threads for engagement with the threads about the boxing and the inner movement of the nut is limited by the shoulder J. For convenience in turning the nut, oppositely disposed notches T' are formed therein, in which the ends of a spanner wrench may engage for turning the nuts in one direction or another.

In adjusting the parts, the spokes are inserted between the spoke engaging lugs, the boxing passed through the openings in the two hub sections and the nut fitted upon the threaded end of the boxing, thus drawing the parts together and locking them so that they will turn together. In the event of it being desired to remove the spoke, the screw may be loosened from the boxing and the hub section separated from the other, as will be readily understood.

What we claim to be new is:

A vehicle hub made up of two flanged sections, the flange of one section being provided with tapering lugs, spokes intermediate the latter, the hub portion of the other section provided with a tapering projection upon its inner end and about the marginal edge of the central opening therein, said projection engaging the inner ends of said spokes, the hub section having said lugs being chambered and provided with shoulders upon the surface thereof, a boxing engaging said shoulders, portions of the boxing at points diametrically opposite being provided with lugs for engagement with grooves upon the inner wall of the adjacent hub section, the hub portion of the section having said tapering projection having a recess in its outer end, a threaded nut for engagement with the boxing and adapted to bear against the inner end of the recess in which it is positioned and forming means for holding the two flanged sections in contact with the spokes.

In testimony whereof we hereunto affix our signatures.

O'DELL KING.
JAMES LARENCE ORR KING.
THOMAS HALSEY FOX.

Copies of this patent may be obtained for five cents each, by addressing the "Commissioner of Patents, Washington, D. C."